(No Model.)

A. F. MEISSELBACH.
FISHING REEL DRAG.

No. 352,926. Patented Nov. 23, 1886.

Attest:
L. Lee.
Henry J. Theberath.

Inventor:
August F. Meisselbach,
per Crane & Miller, Attys.

UNITED STATES PATENT OFFICE.

AUGUST F. MEISSELBACH, OF NEWARK, NEW JERSEY.

FISHING-REEL DRAG.

SPECIFICATION forming part of Letters Patent No. 352,926, dated November 23, 1886.

Application filed August 10, 1886. Serial No. 210,526. (No model.)

*To all whom it may concern:*

Be it known that I, AUGUST F. MEISSELBACH, a citizen of the United States, residing at Newark, Essex county, New Jersey, have invented certain new and useful Improvements in Fishing-Reel Drags, fully described and represented in the following specification and the accompanying drawings, forming a part of the same.

This invention relates to an improved form of drag pressed upon the edge of both the reel-flanges, (and especially adapted for use in casting,) and which is provided with a thumb-piece close to the shank of the fishing-pole, by which the pressure of the drag may be lightened or graduated in any desired degree.

The invention consists in the combination, with a foot for attaching the reel to the pole, and a standard projected upright from the foot, of a reel sustained upon such standard edgewise to the pole, and a leaf-spring secured at one end to the foot, and provided at the other end with a cross-bar to press upon the edges of the flanges, and with a thumb-piece projected from such cross-bar, close to the pole, to admit the pressure of the operator's thumb while holding the pole in his hand.

Figure 1:
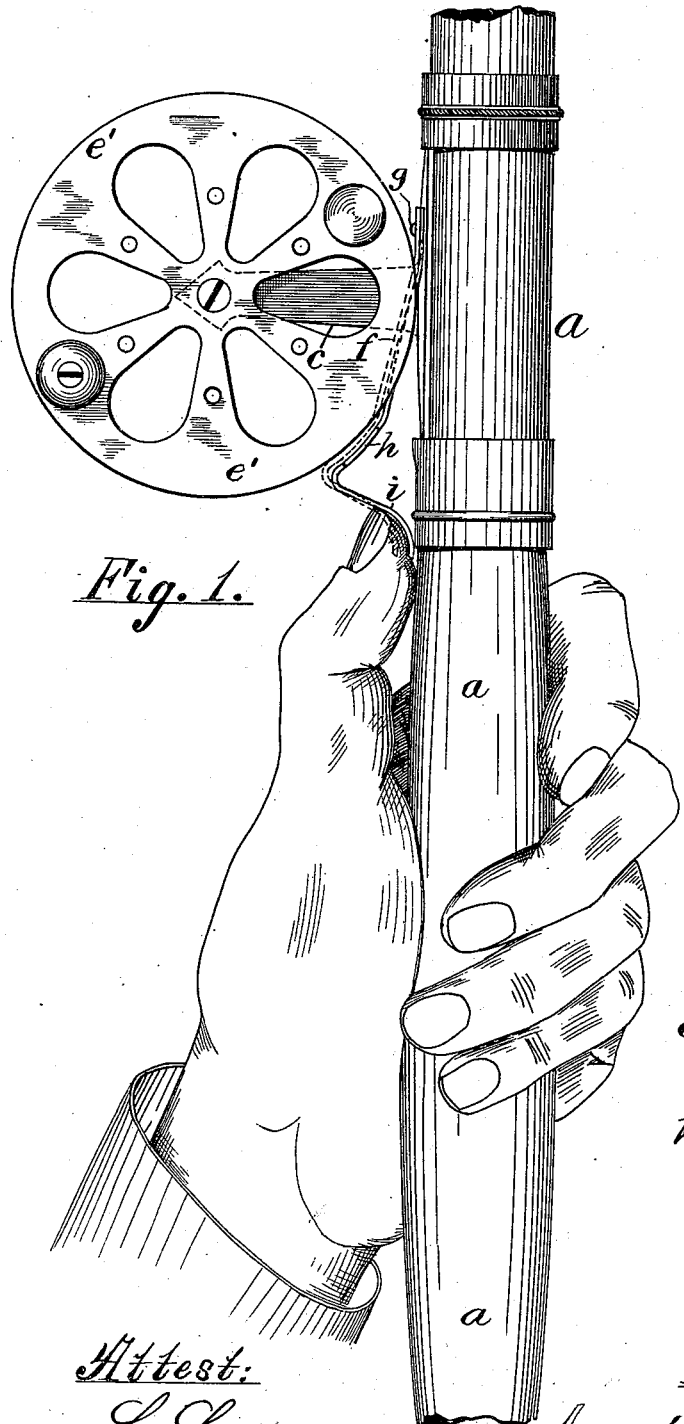
Figure 2:
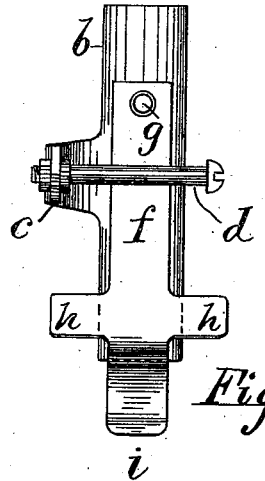
Figure 3:
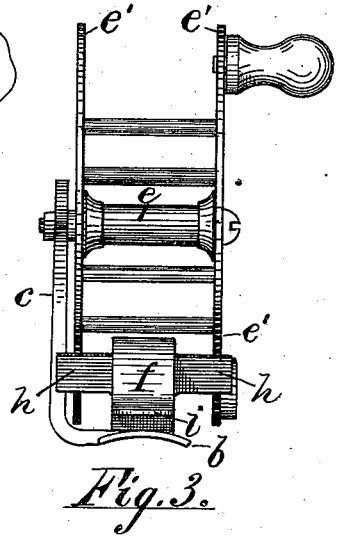

In the drawings, Figure 1 is a side view of the reel and the butt of the pole sustained in the hand of the operator. Fig. 2 is a plan of the foot with the drag attached thereto, and the standard having the reel-pivot projected therefrom; and Fig. 3 is an end view of the foot and standard, with the reel and drag detached from the pole.

*a* represents the pole; *b*, the foot; *c*, the standard; *d*, the pivot projected laterally from its upper end, and fitted to the hub of the reel *e*, so as to sustain latter edgewise to the pole. The flanges of the reel *e'* thus run close to the foot *b*, and the drag is formed as a spring, *f*, secured at one end by a rivet, *g*, to the foot, and having at the other end a cross-bar, *h*, adapted, as shown in Fig. 3, to project across the edges of the flanges, and to press normally against the same. Beyond the cross-bar the thumb-piece *i* of the drag is projected nearly to the pole, its normal position, with that of the drag when pressed upon the reel, being shown in dotted lines in Fig. 1, and in black lines as when ward the pole by the thumb of the operator and the cross-bar withdrawn from the reel. The simultaneous pressure of the drag upon both the flanges *e'* makes it much more quick and effective when in operation, and the location of the thumb-piece in such a convenient relation to the pole and the operator's thumb enables him, while resting the inner side of his thumb upon the pole, to press gradually upon the piece *i*, and to diminish or regulate the pressure of the drag upon the reel in any desired degree. The tip end of the thumb-piece being somewhat removed from the pole when the drag is pressed against the reel, also affords him an opportunity to insert his thumb-nail between the piece *i* and the pole, and to augment the pressure of the drag upon the reel, if required.

I am aware that drags have been heretofore applied to the side and edge of a reel-flange, and I do not therefore claim such a construction broadly; but my invention differs from others in possessing the cross piece *h*, adapted to press upon the edge of both the flanges at once.

My invention is of special use in bait-casting, as the form of drag and the location of the thumb-piece enable the operator to check the reel most perfectly.

Having thus set forth the nature and operation of my invention, what I claim herein is—

The combination, with the reel having flanges *e' e'*, of the foot *b*, provided with standard *c* and pivot *d*, and the drag consisting in the spring *f*, secured to the foot *b* at one end, and provided with the cross-bar *h*, and thumb-piece *i*, adapted to lie adjacent to the pole where the reel is sustained thereon, substantially as herein shown and described.

In testimony whereof I have hereunto set my hand in the presence of two subscribing witnesses.

AUGUST F. MEISSELBACH.

Witnesses:
THOS. S. CRANE,
HENRY J. MILLER.